(12) United States Patent
Sugihara et al.

(10) Patent No.: US 9,690,102 B2
(45) Date of Patent: Jun. 27, 2017

(54) LIGHT-GUIDING PRISM AND IMAGE DISPLAY APPARATUS

(71) Applicant: OLYMPUS CORPORATION, Tokyo (JP)

(72) Inventors: Ryohei Sugihara, Tokyo (JP); Shinya Takahashi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/138,726

(22) Filed: Apr. 26, 2016

(65) Prior Publication Data

US 2016/0238847 A1    Aug. 18, 2016

Related U.S. Application Data

(63) Continuation of application No. PCT/JP2013/006353, filed on Oct. 28, 2013.

(51) Int. Cl.
| | |
|---|---|
| *G02B 17/00* | (2006.01) |
| *G02B 27/01* | (2006.01) |
| *G02B 5/04* | (2006.01) |
| *G02B 17/08* | (2006.01) |

(52) U.S. Cl.
CPC ............ *G02B 27/0172* (2013.01); *G02B 5/04* (2013.01); *G02B 17/086* (2013.01); *G02B 2027/012* (2013.01); *G02B 2027/0121* (2013.01); *G02B 2027/0178* (2013.01)

(58) Field of Classification Search
USPC .......................................................... 359/726
See application file for complete search history.

(56) References Cited

FOREIGN PATENT DOCUMENTS

| | | | |
|---|---|---|---|
| CN | 101846803 | A | 9/2010 |
| CN | 102692707 | A | 9/2012 |
| JP | 2008-535001 | A | 8/2008 |
| JP | 2010-122478 | A | 6/2010 |
| JP | 2010-224473 | A | 10/2010 |
| JP | 2012-168427 | A | 9/2012 |
| JP | 2012-203113 | A | 10/2012 |

OTHER PUBLICATIONS

International Search Report dated Dec. 10, 2013 issued in PCT/JP2013/006353.
Chinese Office Action dated Jan. 25, 2017 in Chinese Patent Application No. 201380080256.1.

*Primary Examiner* — Jack Dinh
(74) *Attorney, Agent, or Firm* — Scully, Scott, Murphy & Presser, P.C.

(57) ABSTRACT

Provided is a light guide prism including: an incident surface on which image light from a display device is incident; one or more reflection surfaces which reflect the image light incident thereon, the reflection surfaces including at least an emission side reflection surface; and an emission surface forming an acute angle with the emission side reflection surface and emitting the image light reflected by the emission side reflection surface, toward an eyeball of an observer. In one aspect, the light guide prism includes a prism tip disposed as protruding from an end of the emission side reflection surface and from an end of the emission surface, in a direction in which a width between the emission side reflection surface and the emission surface narrows. Further provided is an image display apparatus including: a display device which emits image light; the light guide prism; and a support.

4 Claims, 5 Drawing Sheets

LIGHT-GUIDING PRISM AND IMAGE DISPLAY APPARATUS

CROSS-REFFERENCE TO RELATED APPLICATION

The present application is a Continuing Application based on International Application PCT/JP2013/006353 filed on Oct. 28, 2013, the entire disclosure of this earlier application being herein incorporated by reference.

TECHNICAL FIELD

The present disclosure relates to a light-guiding prism (also referred to as light guide prism) which guides image light emitted from a display device to display a virtual image of the display image within the visual field of the observer, and also to an image display apparatus using the light guide prism.

BACKGROUND

There has been proposed in recent years a compact and wearable image display apparatus to be head-mounted or spectacle-mounted. As an example of such image display apparatus, there has been known a device in which image light of an image displayed on a compact image display apparatus is guided through a transparent light guide member to the front of the eye of the observer so as to be displayed as an enlarged virtual image within the visual field of the observer (see, for example, Patent Literatures (PTL) 1, 2). A compact and light-weight light guide member does not largely shield the visual field and allows the entire image display apparatus to be small-sized and light-weight, making the image display apparatus available as a wearable device that can always be put on during use.

According to PTL 2 for example, an optical surface that does not serve as a reflection surface is grained, so as to reduce stray light or ghost light.

CITATION LIST

Patent Literature

PTL 1: JP2010122478A
PTL 2: JP2012203113A

SUMMARY

Technical Problem

However, it has still been difficult to completely eliminate stray light or ghost light merely through the graining of an optical surface as described above. Rather, such graining requires an additional step, which leads a problem of high cost for mass production.

It could therefore be helpful to provide a light guide prism usable as a light guide member, in which stray light and ghost light are suppressed, and an image display apparatus using the light guide prism.

As a result of intensive studies to solve the aforementioned problems, it has been found that, in a light guide member, light reflected on a tip face that is in contact with the emission surface of an eyepiece lens is turned into stray light or ghost light which are extremely obtrusive to the observer. Thus, it is important to effectively reduce such stray light and ghost light. Then, there has been obtained a novel findings that a prism tip protruding from an end of the emission side reflection surface and from an end of the emission surface may be disposed in a direction in which the width between the emission side reflection surface and the emission surface narrows, so as to advantageously achieve the aforementioned object, based on which the disclosed device has been completed.

The summary and construction of the disclosure is as follows.

A light guide prism according to a first one of the disclosed aspects includes: an incident surface through which image light from a display device is incident; one or more reflection surfaces which reflect the image light incident thereon, the reflection surfaces including at least an emission side reflection surface; an emission surface forming an acute angle with the emission side reflection surface and emitting the image light reflected by the emission side reflection surface, toward an eyeball of an observer; and a prism tip disposed as protruding from an end of the emission side reflection surface and from an end of the emission surface, in a direction in which a width between the emission side reflection surface and the emission surface narrows.

Further, in the disclosed light guide prism, the emission surface may preferably be formed as a lens surface, and the prism tip may preferably have a plane defined as a tip face, the plane most protruding from the end of the emission side reflection surface and from the end of the emission surface, the tip face being tilted, relative to the optical axis of the emission surface, in a direction toward the eyeball side of the observer.

In addition, in the disclosed light guide prism, the prism tip may preferably have a first plane contacting with the emission surface and a second plane contacting with the emission side reflection surface, the first plane and the second plane preferably being substantially parallel with each other.

Here, a light guide prism according a second one of the disclosed aspects includes: an incident surface through which image light from a display device is incident; one or more reflection surfaces which reflect the image light incident thereon, the reflection surfaces including at least an emission side reflection surface; and an emission surface forming an acute angle with the emission side reflection surface and emitting the image light reflected by the emission side reflection surface, toward an eyeball of an observer, in which: the light guide prism includes: a light guide part; a sheet-like plate part; and a convex lens part, which are integrally formed, the light guide part guiding the image light toward the eyeball, the plate part being disposed adjacent to the light guide part, the convex lens part being formed on the plate part and causing the image light to be observed as a virtual image; and the plate part has a portion protruding from an end of the emission side reflection surface and from an end of the emission surface, in a direction in which a width between the emission side reflection surface and the emission surface narrows.

An image display apparatus disclosed herein includes: a display device which emits image light; the light guide prism described above; and a support which fixedly supports the display device and the light guide prism onto a head of an observer.

Advantageous Effect

The disclosed embodiments and structures are capable of providing a light guide prism for use as a light guide member, in which stray light and ghost light are suppressed, and an image display apparatus using the light guide prism.

DETAILED DESCRIPTION

In below, an embodiment disclosed herein is illustrated by way of example with reference to the drawings.

Embodiment 1

Figure 1:
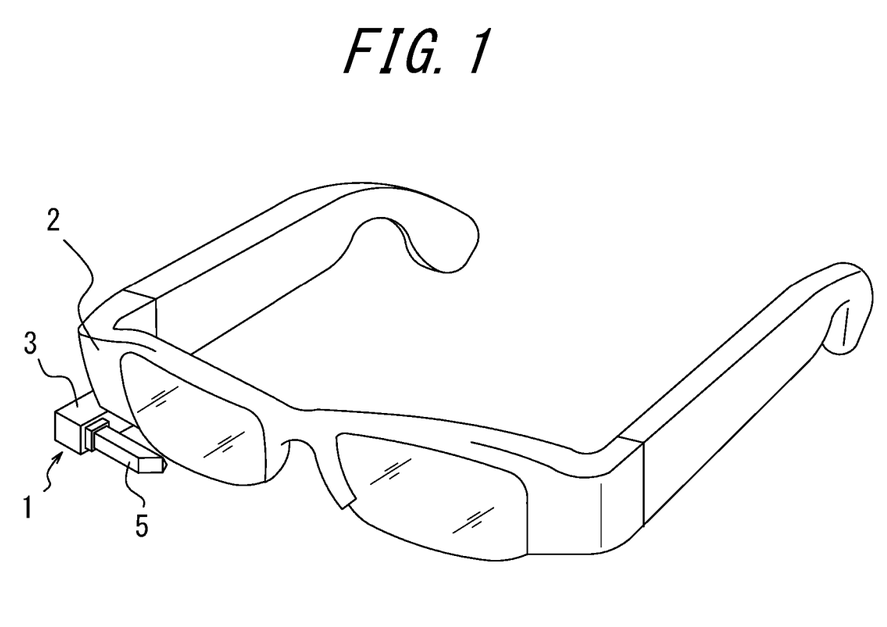
FIG. 1 is a perspective view of an image display apparatus according to Embodiment 1.
Figure 2A:
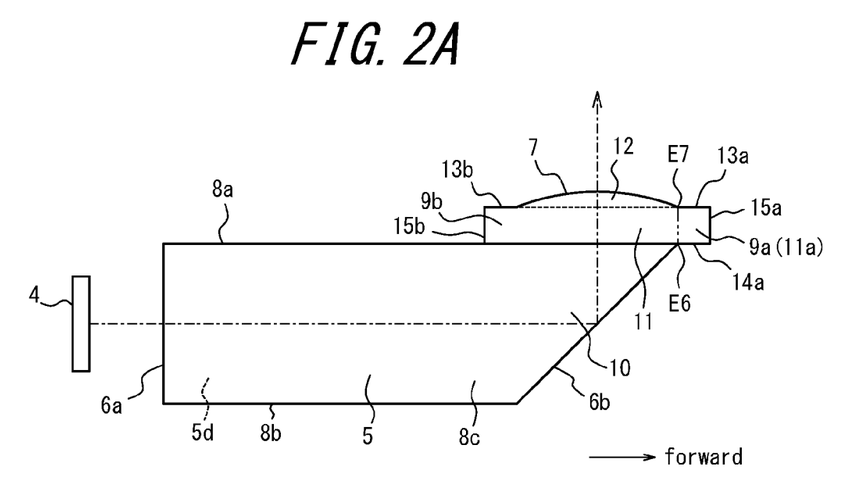
FIG. 2A is a plan view of a light guide prism according to Embodiment 1.

FIG. 1 is a perspective view of an image display apparatus 1 according to Embodiment 1 disclosed herein. The image display apparatus 1 includes: a support 2 in a spectacle-like shape, which fixedly supports the entire image display apparatus onto the head of the observer; a main body 3 being fixed to a temple (frame in the temporal region) of the support 2 and incorporating therein a display device 4 (see FIG. 2); and a light guide prism 5 being supported, at one end thereof, supported by the main body 3 and having the other end extended to the front of the eye of the observer when the device is worn by the observer. The main body 3 includes, in addition to the display device 4, an electronic circuit for displaying an image on the display device 4 and communications capabilities for receiving video data through wire or radio from outside the main body 3.

Figure 2B:
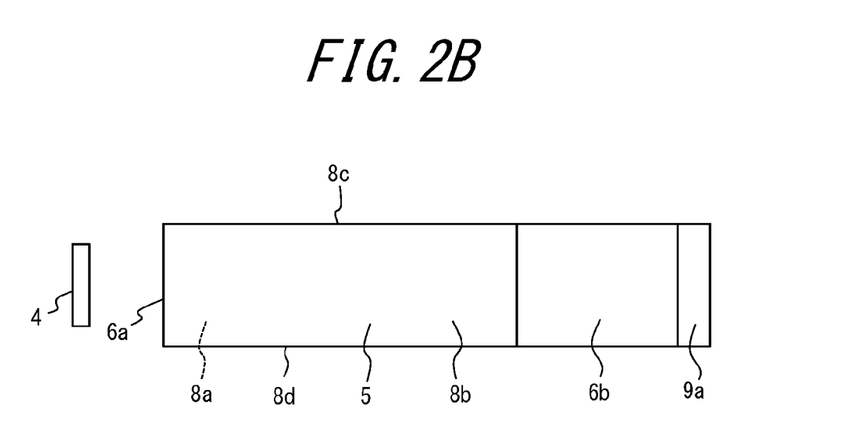
FIG. 2B is a front view of a light guide prism according to Embodiment 1.

FIG. 2 A is a plan view of the light guide prism 5 according to an embodiment disclosed herein, and FIG. 2B is a front view of the light guide prism 5 according to an embodiment disclosed herein. As illustrated in FIGS. 2A and 2B, the light guide prism 5 has an incident surface 6a through which image light from the display device 4 is incident, one or more reflection surfaces including at least an emission side reflection surface 6b (in the illustrated example, the reflection surface has only one emission side reflection surface 6b), and an emission surface 7 which forms an acute angle with the emission side reflection surface 6b and emits, toward an eyeball of the observer, image light reflected by the emission side reflection surface 6b. The emission surface 7 is formed as a lens surface.

Here, the display device 4 is a liquid crystal display device or an organic EL device for displaying an image to be observed, and incorporated within the main body 3 of FIG. 1. The display device 4 is configured to cause image light of an image displayed on the display device 4 to be incident through the incident surface 6a of the light guide prism 5. A protection window (not shown) for protecting the display device 4 may desirably be disposed between the display device 4 and the incident surface 6a of the light guide prism 5.

Here, the light guide prism 5 is formed of a transparent resin elongated in one direction. The light guide prism 5 includes the incident surface 6a and the reflection surface 6b at both ends in the longitudinal direction corresponding to the traveling direction of image light, and has a first side face 8a, a second side face 8b, a third side face 8c, and a fourth side face 8d between the incident surface 6a and the reflection surface 6b so as to surround the optical path of image light. In the image display apparatus 1 worn by the observer, the first side face 8a is positioned at a plane facing the front of the observer, the second side face 8b is positioned at a plane facing opposite to the front of the observer, the third side face 8c serves as an upper face of the light guide prism 5, and the fourth side face 8d serves as a lower face of the light guide prism 5. In other words, the first side face 8a and the second side face 8b are opposed to each other, and the third side face 8c and the fourth side face 8d are opposed to each other.

In FIGS. 2A and 2B, the first to fourth side faces 8a to 8d are formed as planes each being substantially perpendicular to the incident surface 6a. However, the first to fourth side faces 8a to 8d may be slightly curved, or may be formed wider on the incident surface 6a side than the reflection surface 6b side. For example, the distance between the third side face 8c and the fourth side face 8d may be shorter on the reflection surface 6b side than on the incident surface 6a side.

The reflection surface 6b is formed as a slope tilted at about 45° relative to the longitudinal direction of the light guide prism 5, with the inner surface thereof facing the observer. The reflection surface 6b is formed as a mirror face through, for example, aluminum sputtering so that image light traveling through the light guide prism 5 in the longitudinal direction is subjected to total reflection. The surface may be formed as a total reflection surface without being coated with a reflective film, depending on the conditions such as the refractive index of the material of the light guide prism 5 and the angle of the reflection surface.

The first side face 8a has an emission surface 7 disposed in a part adjacent to the reflection surface 6b. The emission surface 7 is formed as a convex surface positioned on the optical path of image light reflected by the reflection surface 6b toward the eyeball. The emission surface 7 is formed integrally with the light guide prism 5. The emission surface 7 may be integrally formed with the light guide prism 5 using a resin, to thereby allow the light guide prism 5 to be mass-produced at low cost. However, the emission surface 7 may also be formed of a plano-convex lens cemented onto the first side face 8a formed as a plane. In FIGS. 2 to 9, the optical axis of the emission surface 7 is indicated by the alternate long and short dash line. The optical axis is bent at the reflection surface 6b and passes through the center of the display device 4. Between the incident surface 6a and the reflection surface 6b, the direction of the optical axis coincides with the longitudinal direction of the light guide prism 5.

Here, in FIGS. 2A, 2B, the traveling direction of normal light of image light, in the longitudinal direction of the light guide prism 5, is defined as the forward direction. At this time, as illustrated in FIG. 2A, the light guide prism 5 of Embodiment 1 further has a prism tip 9a which is positioned between the emission surface 7 and the reflection surface 6b and protrudes further forward relative to the forward end E7 of the emission surface 7 and the forward end E6 of the reflection surface 6b. In other words, the light guide prism 5 has the prism tip 9a disposed as protruding from an end of the reflection surface 6b and from an end of the emission surface 7, in the direction in which the width between the reflection surface 6b and the emission surface 7 narrows. The light guide prism 5 of Embodiment 1 may also be provided, in light of the external appearances, with a prism tip 9b which is positioned between the emission surface 7 and the reflection surface 6b and protruding further backward relative to the backward end of the emission surface 7 and the backward end of the reflection surface 6b. However, the prism tip 9b on the backward side may be omitted for further reduction of size and weight. The prism tips 9a, 9b may each have a protruding width of, for example, 0.5 mm to 2 mm, without being particularly limited thereto. Further, the prism tips 9a, 9b each may preferably have a height of 0.5 mm to 1.5 mm.

The light guide prism 5 of Embodiment 1 includes, as illustrated in FIG. 2A: a light guide part 10 (corresponding to the part defined by the incident surface 6a, the reflection surface 6b, and the first to fourth side faces 8a to 8b in the illustrated example) which guides image light toward the eyeball; a sheet-like plate part 11 disposed adjacent to the light guide part 10; and a convex lens part 12 formed on the plate part 11, the convex lens part 12 causing the image light to be observed as a virtual image. The light guide part 10, the plate part 11, and the convex lens part 12 are integrally formed. Then, the plate part 11 has a protruding part 11a (9a) as a part protruding from an end of the reflection surface 6b and from an end of the emission surface 7, in a part protruding forward relative to the light guide part 10, i.e., in the direction in which the width between the reflection surface 6b and the incident surface 7 narrows.

The prism tip 9a on the forward side has two flat faces 13a, 14a each substantially parallel with the side faces 8a, 8b, respectively, in the illustrated example. Then, the prism tip 9a on the forward side has a tip face 15a which abuts the two flat faces 13a, 14a, and is substantially perpendicular to the side faces 8a, 8b. The tip face 15a is a plane positioned on the most forward side of the prism tip 9a, that is, a plane that is most protruding from an end of the reflection surface 6b and from an end of the emission surface 7. Meanwhile, the prism tip 9b on the backward side has one flat face 13b substantially parallel with the side faces 8a, 8b in the illustrated example. Then, the prism tip 9b on the backward side has a tip face 15b which abuts the flat face 13b and the side face 8b and is substantially perpendicular to the side faces 8a, 8b. The tip face 15b is a plane positioned on the most backward side of the prism tip 9b. In the illustrated example, the tip faces 15a, 15b are configured as mirror-finished faces being small in surface roughness. However, the tip face 15a alone may be configured as a mirror-finished face. Hereinafter, the operation and effect of the light guide prism 5 of Embodiment 1 are described.

Figure 3:
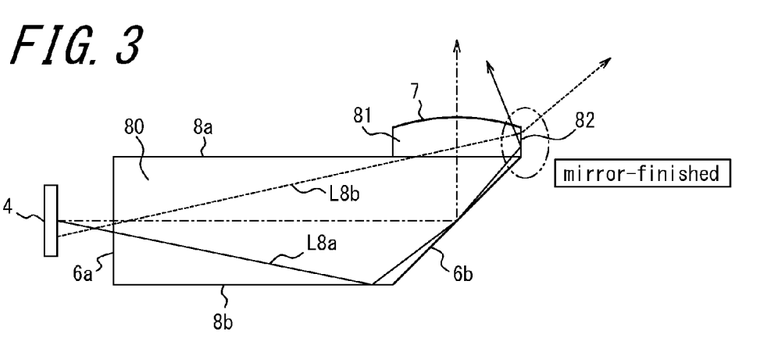
FIG. 3 is a plan view illustrating an exemplary optical path of irregular light in a conventional light guide prism.

First, FIG. 3 is a plan view illustrating an exemplary optical path of irregular light in a conventional light guide prism 80. In the light guide prism 80 of FIG. 3, an eyepiece lens 81 has a mirror-finished tip face 82 that is in contact with the emission surface 7. In this case, as illustrated in FIG. 3, an irregular light beam, as illustrated by the arrow L8a, which is once reflected by the side face 8b and then subjected to the second reflection on the reflection surface 6b before being incident on the tip face 82, will be incident on the tip face 82 at a shallow angle, and thus subjected to total reflection on the tip face 82 toward the direction of the eyeball of the observer to become undesired light extremely obtrusive. Meanwhile, in the light guide prism 80 of FIG. 3, which has the mirror-finished tip face 82 as described above, an irregular light beam illustrated by the arrow L8b being directly incident from the display device 5 onto the tip face 82 is allowed to transmit in a direction different from that of the eyeball, so as not to generate undesired light.

Figure 4:
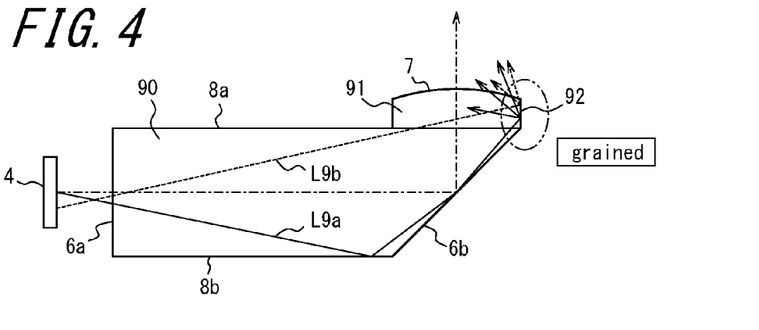
FIG. 4 is a plan view illustrating an exemplary optical path of irregular light in another conventional light guide prism.

FIG. 4 is a plan view illustrating an optical path of irregular light in another conventional light guide prism 90. In the light guide prism 90 of FIG. 4, an eyepiece lens 91 has a grained tip face 92 that is in contact with the emission surface 7. In this case, as illustrated in FIG. 4, a light beam, as illustrated by the allow L9a, which is once reflected by the side face 8b and then subjected to the second reflection on the reflection surface 6b before being incident on the tip face 92 may be reduced through diffusion, but undesired light traveling toward the eyeball cannot be completely eliminated. In addition, an irregular light beam indicated by the arrow L9b which is directly incident to the tip face 92 from the display device 4, without causing any problem in the light guide prism 80, will travel in part through diffusion to the eyeball to eventually become an undesired light beam.

Figure 5:
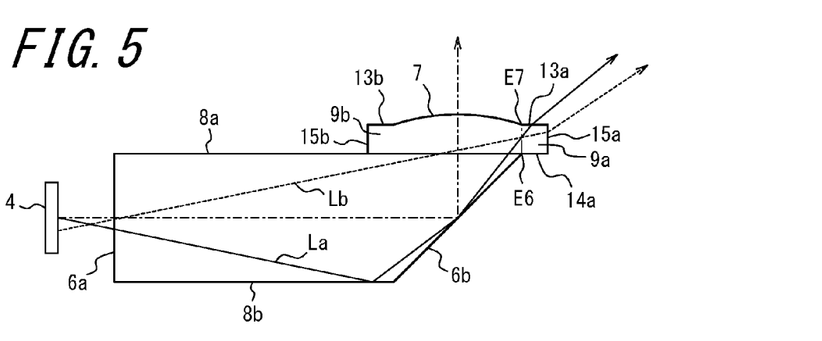
FIG. 5 is a plan view illustrating reflection of light in the light guide prism according to one embodiment disclosed herein.

FIG. 5 is a plan view illustrating reflection of light in the light guide prism 5 according to Embodiment 1. As illustrated in FIG. 5, the light guide prism 5 of Embodiment 1 has the prism tip 9a protruding further forward relative to the forward end E7 of the emission surface 7 and the forward end E6 of the reflection surface 6b (i.e., in the direction in which the width between the reflection surface and the emission surface 7 narrows). Thus, the tip face 15a is positioned forward relative to the ends E7 and E6, which hinders the light beam La which is once reflected on the side face 8b and then subjected to the second reflection on the reflection surface 7b, from abutting the tip face 15a. Instead, and the light beam La will be emitted outside from the flat face 13a on the emission surface 7 side. As a result, the light beam La is emitted in a direction different from that of the eyeball of the observer, and thus will not be observed as undesired light. Further, the light beam Lb corresponding to the arrows L8b and L9b of FIGS. 3 and 4 may also be transmitted in a direction different from that of the eyeball without becoming undesired light because the tip face 15a is mirror-finished. As described above, the light guide prism 5 of Embodiment 1 and the image display apparatus 1 using the same are capable of reducing stray light and ghost light.

Embodiment 2

Figure 6:
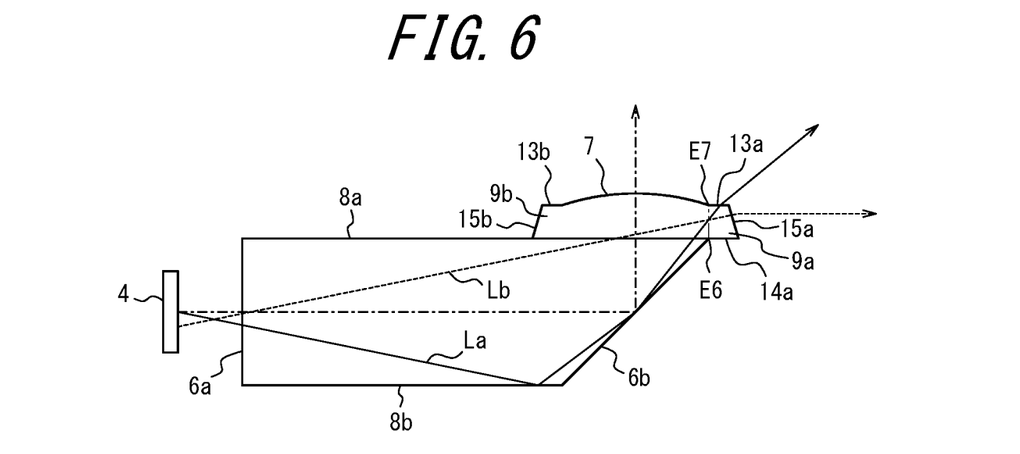
FIG. 6 is a plan view of a light guide prism according to Embodiment 2.

FIG. 6 is a plan view of a light guide prism according to Embodiment 2 disclosed herein. The light guide prism 5 of Embodiment 2 is different from the light guide prism 5 of Embodiment 1 in that the outer surfaces of the tip faces 15a, 15b are tilted, relative to the optical axis of the emission surface 7, in the direction toward the eyeball side of the observer. In the illustrated example, the tip faces 15a, 15b are both tilted, relative to the optical axis of image light, in a direction toward the eyeball side; however, only the tip face 15a may be tilted as above.

The disclosed light guide prism may preferably have the outer surface of the tip face 15a on the forward side tilted, relative to the optical axis of the emission surface 7, in the direction toward the eyeball side. This configuration changes the emitting direction of the emitted light beam Lb having been directly incident on the tip face 15a from the display device 4, to thereby allow the light beam Lb to be emitted in a direction further different from that of the eyeball.

Figure 7:
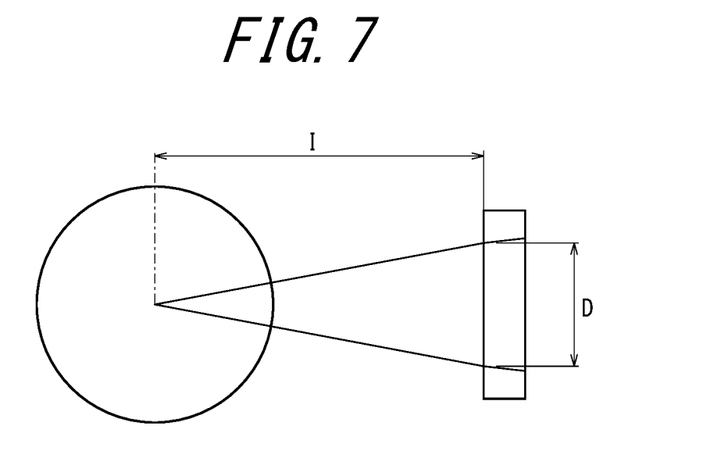
FIG. 7 is for illustrating an eye relief and the dimension of an emission surface.

Here, as illustrated in FIG. 7, the dimension (eye relief) I (mm) measured from the emission surface 7 to the pupil of the observer may preferably be 18 mm to 35 mm, without being particularly limited thereto, and the diameter D (mm) of the emission surface may preferably be 4 mm to 10 mm, without being particularly limited thereto. At this time, the tip face 15a may preferably be tilted at 3° to 15° relative to the optical axis of image light to be emitted, in order to have the tip face 15a hard to see directly from the position of the eyeball.

Further, in the disclosed light guide prism, as illustrated in FIGS. 5 and 6, the prism tip 9a has a flat face 13a contacting with the emission surface 7 and a flat face 14a contacting with the reflection surface 6b, where the flat face 13a and the flat face 14b may preferably be substantially parallel with each other. The reason is as follow. In the light guide prism 5 according to Embodiment 2 of FIGS. 5, 6, the light beam abutting the tip faces 82, 92 in the examples of FIGS. 3, 4 is incident on the flat face 13a. Here, with the flat face 13a being substantially parallel with the flat face 14a, the light beam will be emitted in a direction further different from that of the eyeball, so that light from the background becomes hardly identifiable as undesired light.

Embodiment 3

Figure 8A:
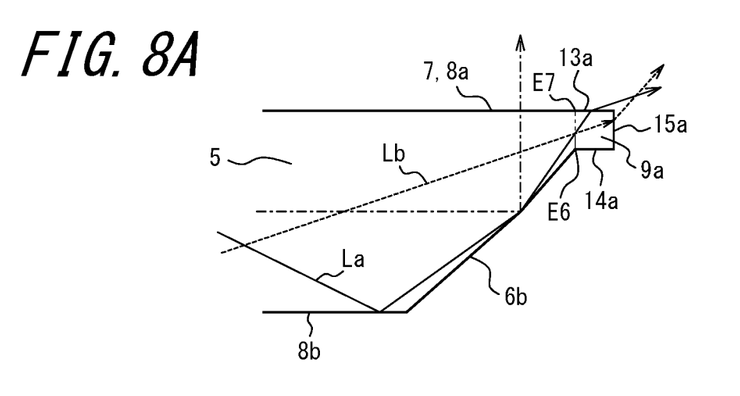
FIG. 8A is a partial plan view of a light guide prism according to Embodiment 3.
Figure 8B:
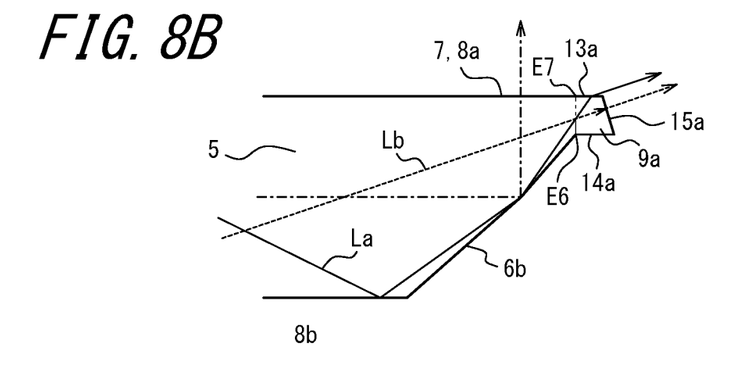
FIG. 8B is a partial plan view of the light guide prism according to Embodiment 3.

FIGS. 8A, 8B each are a partial plan view of the light guide prism 5 of Embodiment 3 disclosed herein. Though the display device and part of the optical path on the incident surface side are omitted in FIGS. 8A, 8B, the display device and the incident surface are similarly provided as in the aforementioned Embodiments. As illustrated in FIG. 8A, the light guide prism 5 has a reflection surface 6b formed as a concave mirror that is curved concave to the inside of the light guide path (or curved convex to the outside).

Further, the light guide prism 5 has a prism tip 9a protruding forward relative to the forward-side ends E7, E6 of the emission surface 7 and the reflection surface 6b. In other words, the light guide prism 5 has the prism tip 9a disposed as protruding from an end of the reflection surface 6b and from an end of the emission surface 7, in the direction in which the width between the reflection surface 6b and the emission surface 7 narrows. The prism tip 9a has flat faces 13a, 14a which are substantially parallel with the side faces 8a, 8b, where the flat face 13a in this case is coplanar with the side face 8a. Further, the prism tip 9a has a tip face 15a which abuts the flat faces 13a and 14a. The tip face 15a is configured as a mirror-finished face. As illustrated by the alternate long and short dash line in the drawings, normal light of image light is reflected by the concave mirror 6b to be emitted from the emission surface 7 or the side face 8b toward the eyeball.

As illustrated in FIG. 8A, the light beam La reflected twice by the side face 8b and the reflection surface 7b is incident on the flat face 13a, without being incident on the tip face 15a, and thus will be transmitted in a direction different from that of the eyeball, without being incident inside the eyeball to generate stray light or ghost light. Similarly, with the tip face 15a being configured as a mirror-finished face, the light beam Lb to be directly incident on the tip face 15a from the display device will be transmitted in a direction different from that of the eyeball, without generating stray light or ghost light. Here, in the case of using a concave mirror as the reflection surface 6b, the tip face 15a may again preferably be tilted, relative to the optical axis of the emission surface, in a direction toward the eyeball side, as illustrated in FIG. 8B, because the light beam Lb directly incident on the tip face 15a from the display device may be changed in emission direction when emitted, so as to allow the light beam Lb to be emitted in a direction further different from that of the eyeball.

Figure 9:
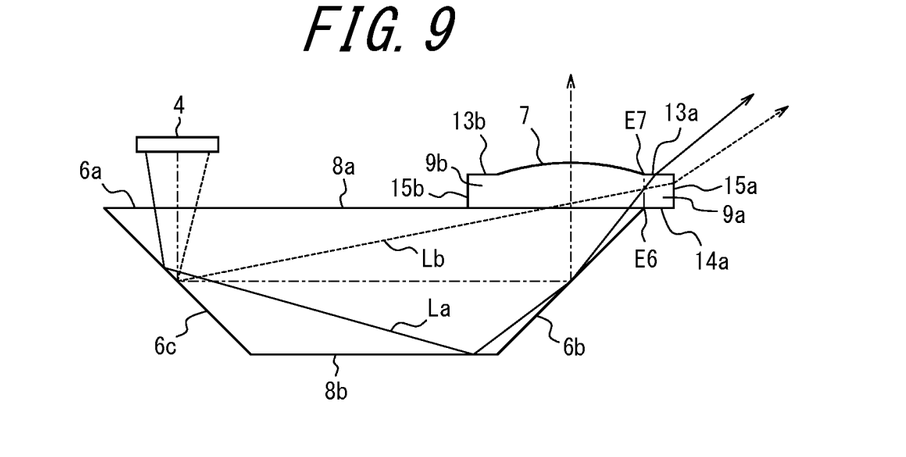
FIG. 9 is a plan view of a modified example of the disclosed light guide prism.

The aforementioned Embodiments shall in no way limit the present disclosure, and may be subjected to various modifications and alternations. For example, in the aforementioned Embodiments, the incident surface is disposed at the emission side end of the light guide prism, the incident surface being perpendicular to the longitudinal direction of the light guide prism, but the shape of the light guide prism on the incident side is not limited thereto. FIG. 9 illustrates a modified example of the light guide prism of Embodiment 1 of FIG. 2A, in which the incident-side end has been modified. In this light guide prism 5, a reflection surface 6c tilted in the longitudinal direction is formed also on a position facing the emission side reflection surface 6b, while forming the incident surface 6a at the end of the first side face 8a disposed on the near side of the observer, and the display device 4 is disposed so as to face the incident surface 6a. With this configuration, image light emitted from the display device 4 is incident on the light guide prism 5 from the incident surface 6a, reflected by the reflection surface 6c, and guided through the light guide prism 5 in the longitudinal direction. The emission-side end may also be configured as described above so as to similarly obtain the same operation and effect as those in the aforementioned Embodiments. In addition thereto, the incident-side end may be configured in various ways.

REFERENCE SIGNS LIST 1 image display apparatus
2 support
3 main body
4 display device
5 light guide prism
6a incident surface
6b reflection surface (emission side reflection surface)
6c reflection surface
7 emission surface
8a first side face
8b second side face
8c third side face
8d fourth side face
9a prism tip
9b prism tip
10 light guide part
11 plate part
11a protruding part
12 convex lens part
13a, 13b, 14a flat face
15a tip face
15b tip face
E6, E7 end
La, Lb light beam

The invention claimed is:
1. A light guide prism, comprising:
an incident surface through which image light from a display device is incident;

one or more reflection surfaces which reflect the image light incident thereon, the reflection surfaces including at least an emission side reflection surface;

an emission surface forming an acute angle with the emission side reflection surface and emitting the image light reflected by the emission side reflection surface, toward an eyeball of an observer; and a prism tip disposed as protruding from an end of the emission side reflection surface and from an end of the emission surface, in a direction in which a width between the emission side reflection surface and the emission surface narrows.

2. The light guide prism according to claim 1, wherein the emission surface is formed as a lens surface, and wherein the prism tip has a plane defined as a tip face, the plane most protruding from the end of the emission side reflection surface and from the end of the emission surface, the tip face being tilted, relative to the optical axis of the emission surface, in a direction toward the eyeball side of the observer.

3. The light guide prism according to claim 1, wherein the prism tip has a first plane contacting with the emission surface and a second plane contacting with the emission side reflection surface, the first plane and the second plane being substantially parallel with each other.

4. An image display apparatus, comprising:

a display device which emits image light;

the light guide prism according to claim 1; and a support which fixedly supports the display device and the light guide prism onto a head of an observer.

* * * * *